United States Patent
Dontcheva et al.

(10) Patent No.: US 9,367,523 B2
(45) Date of Patent: Jun. 14, 2016

(54) SYSTEM AND METHOD FOR USING DESIGN FEATURES TO SEARCH FOR PAGE LAYOUT DESIGNS

(75) Inventors: Lubomira A. Dontcheva, San Francisco, CA (US); Ranjitha S. Kumar, San Jose, CA (US); Wilmot Wei-Mau Li, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 413 days.

(21) Appl. No.: 12/862,940

(22) Filed: Aug. 25, 2010

(65) Prior Publication Data

US 2013/0124968 A1    May 16, 2013

Related U.S. Application Data

(60) Provisional application No. 61/245,980, filed on Sep. 25, 2009.

(51) Int. Cl.
    *G06F 17/00* (2006.01)
    *G06F 17/21* (2006.01)
    *G06F 17/22* (2006.01)

(52) U.S. Cl.
    CPC ............ *G06F 17/212* (2013.01); *G06F 17/211* (2013.01); *G06F 17/218* (2013.01); *G06F 17/2247* (2013.01)

(58) Field of Classification Search
    CPC .................................................. G06F 17/211
    USPC .................................. 715/273, 234, 236, 243
    See application file for complete search history.

(56) References Cited

U.S. PATENT DOCUMENTS

| | | | |
|---|---|---|---|
| 5,499,366 A | 3/1996 | Rosenberg et al. | |
| 5,875,441 A | 2/1999 | Nakatsuyama | |
| 5,903,902 A * | 5/1999 | Orr et al. | 715/202 |
| 5,999,664 A * | 12/1999 | Mahoney et al. | 382/305 |
| 6,084,595 A | 7/2000 | Bach et al. | |
| 6,185,587 B1 | 2/2001 | Bernardo et al. | |
| 6,512,531 B1 | 1/2003 | Gartland | |
| 6,684,369 B1 | 1/2004 | Bernardo et al. | |
| 6,816,847 B1 * | 11/2004 | Toyama | 706/14 |
| 6,941,323 B1 | 9/2005 | Galperin | |
| 7,272,789 B2 * | 9/2007 | O'Brien | 715/247 |

(Continued)

OTHER PUBLICATIONS

Vollick, et al., "Specifying Label Layout Styles by Example", UIST Oct. 2007, copyright 2007 ACM, p. 221-230).*

(Continued)

*Primary Examiner* — Amelia Tapp
(74) *Attorney, Agent, or Firm* — Wolfe-SBMC

(57) ABSTRACT

Various embodiments of a system and methods for using design features to search for page layout designs are described. The document and image structures of a page layout design may be analyzed to determine design features which define the style of the page layout design. Dependent on the design features, style scores may be calculated for the page layout design. Page layout designs may be stored in a database in association with corresponding style scores. A user may indicate a desired page layout style by indicating example page layout designs which exhibit the desired style. Style scores for the example page layout designs may be compared to the style scores for page layout designs stored in the database. Dependent on the comparison, page layout designs stored in the database may be selected and displayed to the user.

20 Claims, 8 Drawing Sheets

(56) References Cited

U.S. PATENT DOCUMENTS

| | | | |
|---|---|---|---|
| 7,424,672 B2* | 9/2008 | Simske et al. | 715/243 |
| 7,475,061 B2 | 1/2009 | Bargeron et al. | |
| 7,856,441 B1* | 12/2010 | Kraft | G06F 17/3064 707/758 |
| 8,181,104 B1* | 5/2012 | Helfand et al. | 715/234 |
| 8,538,941 B2 | 9/2013 | Gartland | |
| 2002/0010704 A1 | 1/2002 | Kim et al. | |
| 2002/0099721 A1 | 7/2002 | Ganapathy et al. | |
| 2003/0195883 A1 | 10/2003 | Mojsilovic et al. | |
| 2004/0102958 A1* | 5/2004 | Anderson, IV | 704/4 |
| 2004/0122856 A1* | 6/2004 | Clearwater | 707/104.1 |
| 2004/0255245 A1* | 12/2004 | Yamada et al. | 715/517 |
| 2006/0155549 A1 | 7/2006 | Miyazaki | |
| 2006/0200759 A1* | 9/2006 | Agrawala | G06F 17/211 715/209 |
| 2008/0005149 A1 | 1/2008 | McAfee | |
| 2008/0095445 A1 | 4/2008 | Brandt | |
| 2009/0234707 A1* | 9/2009 | Perez et al. | 705/10 |
| 2013/0124507 A1* | 5/2013 | Gartland | 707/723 |

OTHER PUBLICATIONS

Flickner, et al., "Query by Image and Video Content: The QBIC System", Sep. 1995, Computer, IEEE, p. 23-32.*

Cesarini et al., "Retrieval by Layout Similarity of Documents Represented with MXY Trees," copyright Springer-Verlag Berlin Heidelberg 2002; DAS 2002, LNCS 2423, pp. 353-364.*

Hashimoto et al., "Retrieving Web Page Layouts using Sketches to Support Example-based Web Design," EUROGRAPHICS Workshop on Sketch-Based Interfaces and Modeling (2005), p. 1-10.*

He et al., "Clustering and Searching WWW Images Using Link and Page Layout Analysis," ACM Transactions on Multimedia Computing, Communications and Applications, vol. 3, No. 2, Article 10, Publication date: May 2007, p. 1-25.*

Yu, S., Cai, D., Wen, J., Ma, W., 2003. Improving pseudo-relevance feedback in web information retrieval using web page segmentation, In WWW'03: Proceedings of 12th International Conference on the World Wide Web, 11-18.

U.S. Appl. No. 12/184,037, filed Jul. 31, 2008, Richard A. Gartland, all pages.

Schrier, et al., "Adaptive Layout for Dynamically Aggregated Documents," IUI'08, Maspalomas, Gran Canaria, Spain, Jan. 13-16, 2008, 10 pages.

Gupta, et al., "Document Layout Analysis and Classification and its Application in OCR," EDOCW '06, 10th IEEE Internatinal, Oct. 2006, 1 page.

"Adobe Bridge C53," www.adobe.com/products/creativesuite/bridge/, 2008, 4 pages.

Eglin, Veronique; Stephane Bres, "Document page similarity based on layout visual salience: Application to query by example and document classification," 2003, IEEE, pp. 1-5.

"Advisory Action", U.S. Appl. No. 12/184,037, (Jun. 13, 2012), 3 pages.

"Final Office Action", U.S. Appl. No. 12/184,037, (Jun. 10, 2011), 18 pages.

"Non-Final Office Action", U.S. Appl. No. 12/184,037, (Oct. 11, 2011), 24 pages.

"Non-Final Office Action", U.S. Appl. No. 12/184,037, (Dec. 22, 2010), 15 pages.

"Notice of Allowance", U.S. Appl. No. 12/184,037, (Apr. 15, 2013), 17 pages.

* cited by examiner

SYSTEM AND METHOD FOR USING DESIGN FEATURES TO SEARCH FOR PAGE LAYOUT DESIGNS

PRIORITY INFORMATION

This application claims benefit of priority of U.S. Provisional Application Ser. No. 61/245,980 entitled "System and Method for Using Design Features to Search for Page Layout Designs" filed Sep. 25, 2009, the content of which is incorporated by reference herein in its entirety.

BACKGROUND

A number of databases and websites maintain galleries of page layout designs. These galleries help provide design inspiration and ideas to page layout designers by providing example page layout designs in a variety of different styles. However, these page layout design galleries provide very limited browsing mechanisms. Typically, a designer browses the various designs in a page layout gallery by clicking through pages of layout design examples one page at a time. The designer may be looking for page layout examples that exhibit particular style features. However, due to the limiting browsing mechanisms of the page layout gallery, the designer may end up looking at many irrelevant pages before finding a few page layout examples that match the designer's desired style features. These conventional galleries of page layout designs provide limited, if any, mechanisms for a designer to search for page layout designs that match a particular desired style.

Conventional search methods are typically based on keywords. However, keywords are often not effective at describing a design. It is not uncommon for a designer to prefer one page layout design over another, but not be able to describe an exact cause for the design preference. This is partially due to the fact that page layout designs often evoke emotions, in addition to conveying information. Trying to describe a design using words may be difficult for a designer and may lead to imprecise descriptions. Page layout designs are often described with style terms, such as "minimalist," "colorful," "modern," or "clean," but also with emotional terms, such as "beautiful," "ugly," "exciting," or "depressing." A conventional keyword search is not an effective mechanism for a designer to locate preferred design styles in galleries containing page layout designs.

SUMMARY

Various embodiments of a system and methods for using design features to search for page layout designs are described. The system for searching for page layout designs, as described herein, may provide a mechanism for selecting page layout designs with a particular design style, dependent on one or more example page layout designs. A plurality of page layout designs may be analyzed to determine a plurality of style scores for each one of the plurality of page layout designs. The analysis of a page layout design may include determining design features which define the style of the page layout design. The style scores for a page layout design may be computed dependent on the determined design features for the page layout design.

The system for searching for page layout designs may compare the plurality of style scores for the plurality of page layout designs to a plurality of style scores for one or more example page layout designs. For example, a user may indicate one or more example page layout designs which indicate a particular design style that is preferred by the user. The system for searching for page layout designs may determine, dependent on the comparison of style scores, one or more of the plurality of page layout designs that are similar to the one or more example page layout designs. For example, one or more of the plurality of page layout designs may have style scores that are similar to the style scores of the one or more example page layout designs. The similar style scores may indicate that the one or more page layout designs have a design style that is similar to the design style of the one or more example page layout designs. An indication of the one or more similar page layout designs may be displayed by the system for searching for page layout designs.

Figure 1:
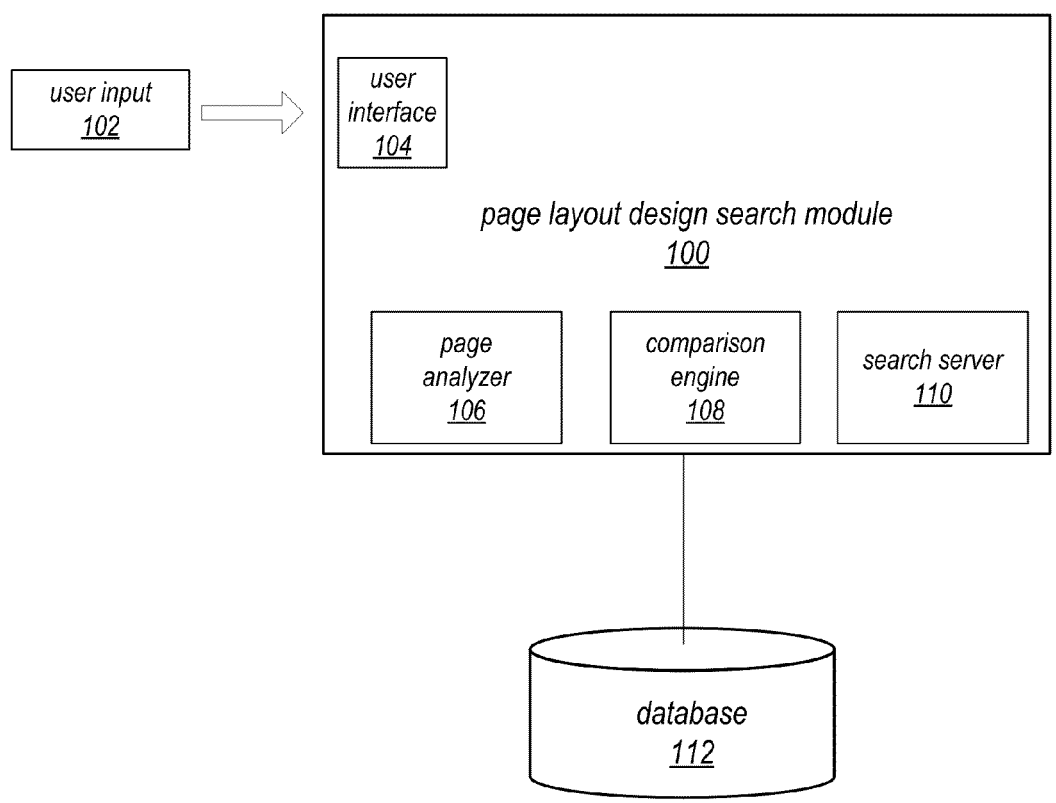
FIG. 1 illustrates an example of a page layout design search module which may be configured to search for page layout designs using design features, according to various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Page Layout Design Search Module

The system for using design features to search for page layout designs may be implemented as a page layout design search module. Embodiments of a page layout design search module, which may be implemented as or in a tool, module, plug-in, stand-alone application, etc., may be used to search for page layout designs using page layout design features. For simplicity, implementations of embodiments of the system for using design features to search for page layout designs described herein will be referred to collectively as a layout search module.

FIG. 1 illustrates an example of a page layout design search module (element 100 of FIG. 1) which may be configured to search for page layout designs using design features. As illustrated in FIG. 1, layout search module 100 may receive user input 102 via user interface 104. The input received via user interface 104 may be page layout designs. For example, a user may indicate, via user interface 104, one or more example page layout design which exhibit styles that the user likes. The user may want to locate other page layout designs which have styles that are similar to the one or more example page layout designs. Examples of page layout designs, in various embodiments, may include web page layout designs or page layout designs for any type of electronic document.

Layout search module 100, as illustrated in FIG. 1, may include page analyzer 106. Page analyzer 106 may be configured to analyze the design of a page layout. As described in further detail below, page analyzer 106 may be configured to analyze the document structure and the image structure of a page layout design. Dependent on the document structure analysis and the image structure analysis, page analyzer 106 may determine design features for the page layout design which define the style of the page layout design.

Comparison engine 108, as illustrated in FIG. 1, may also be included in layout search module 100. Comparison engine 108 may be configured to use the design features determined by page analyzer 106 to compute a set of style scores for a page layout design. Each style score in the set of style scores may be a value that represents the style of a page layout design along a particular style dimension. Examples of style dimensions for which style scores may be computed include, but are not limited to, "light/dark", "warm/cold", "minimalist/magazine", "clean/busy", "modern/grunge", "colorful/muted", and/or "photographic/illustrative". Comparison engine 108 may compute a style score for a page layout design by applying a function to the determined design features for the page layout design. The function used by comparison engine 108 to compute a style score for a particular style dimension, may weight each design feature dependent on the design feature's relative importance to the style dimension. The method used by comparison engine 108 to compute style scores for a page layout design is described in further detail below in reference to FIG. 5.

Layout search module 100 may include, as illustrated in FIG. 1, search server 110. Search server 110 may search for desired page layout designs, dependent on example page layout designs provided by a user via user interface 104. Page layout designs may be stored in a database, such as database 112 illustrated in FIG. 1. Each page layout design stored in database 112 may be stored in association with corresponding style scores computed by comparison engine 108 for the page layout design. For example, a page layout design and respective style scores for the page layout design may be stored in association with each other in database 112. Search server 110 may query database 112 with the style scores for an example page layout design input by a user to locate page layout designs within database 112 that have style scores which are similar to the example page layout design. Search server 112 may respond to a user search query by displaying the located page layout designs which have style scores that are similar to the style score of the example page layout design.

Page Layout Design Search Using Design Features

The system and method for using design features to search for page layout designs may use page layout design features as search query entries for layout search module 100. Layout search module 100 may use the design features to identify page layouts with desired design features. As noted above, conventional search methods typically use keywords as search parameters. However, describing design features using keywords may be difficult and imprecise. Accordingly, keywords may not be an effective search parameter in a system designed to locate page layout designs that have particular design features, or a particular style.

The system and method for using design features to search for page layout designs may include an interface via which a user may identify a preferred page layout design style by specifying one or more examples of the preferred page layout designs. The examples of preferred page layout designs indicated by the user may be used to search a repository (e.g., a gallery) of page layout designs to locate similar designs. The similar page layout designs located within the repository by the search may be designs that are similar in style to the example page layout designs. The similar page layout designs may be displayed to the user, for example, as thumbnail representations of the page layout designs.

Figure 2:
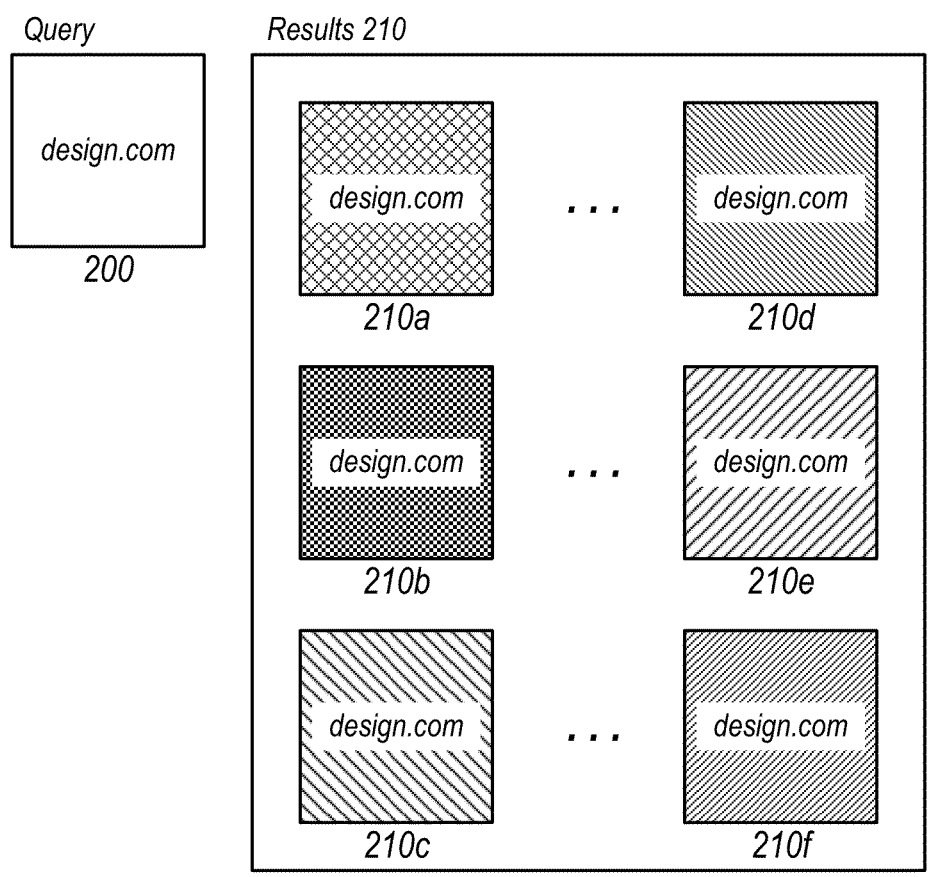
FIG. 2 illustrates an example of an interface for the layout search module that may enable a user to search for desired page layout design styles, according to various embodiments.

FIG. 2 illustrates an example of an interface for layout search module 100 that may enable a user to search for desired page layout design styles. As illustrated in FIG. 2, a user may specify, as a search query entry, one or more example page layout designs. For example, a user may specify example page layout design 200, as illustrated in FIG. 2. Example page layout design 200 may represent a web page design that is preferred by the user. Example page layout design 200 may have a particular design style that is preferred by the user. By identifying design 200 as an example, a user may indicate a desire to see more page layout designs with styles that are similar to the style of design 200. Layout search module 100 may search a repository of page layout designs to locate designs with similar styles and may display the located page layout designs to the user.

In other embodiments, a user may request a search other than a search for similar page layout designs. For example, a user may request a search for page layout designs that are opposite of an example page layout design. In yet other embodiments, a user may specify other search query entries, such as text which indicates a particular design style. For example, a user may specify an example page layout design and text which indicates a particular design style. The user may request a search for page layout designs that are similar to the example page layout design and that vary over a particular range for the indicated design style. As another example, rather than specifying one or more example page layout designs, a user may specify a search query that includes only the particular design style indicated by the user's text entry.

As illustrated in FIG. 2, layout search module 100 may return a set of search results 210, dependent on the search query entered by a user. For example, the set of search results 210 may be page layout designs which have a similar style to the example page layout design indicated by the user. As another example, the set of search results may also include similar page layout designs which vary along one or more style dimensions. For example, in response to a user search query that requests minimalist designs which vary in color, layout search module 100 may return page layout designs which are minimalist designs that vary in color. Page layout designs 210a-210f are examples of page layout design search results that layout search module 100 may display to the user. In some embodiments, page layout designs 210a-210f may be displayed as thumbnail images, as illustrated in FIG. 2. A user may be able to view larger images of the page layout designs. For example, the user may select a thumbnail of a page layout design in the search results to view a larger image of the design. As another example, for page layout designs representing web pages, the user may load a selected page layout design into a web browser. In other embodiments, the page layout design search results may be displayed using a variety of other methods. For example, the page layout designs may be displayed at full size, as different tabs within a web browser, which a user may scroll through to view the page layout designs. In some embodiments, a user may save preferred page layout designs from the search results in one or more collections. Each collection may include one or more preferred page layout designs and may be created and labeled by the user such that the user may organize the saved designs for future reference.

Figure 3:
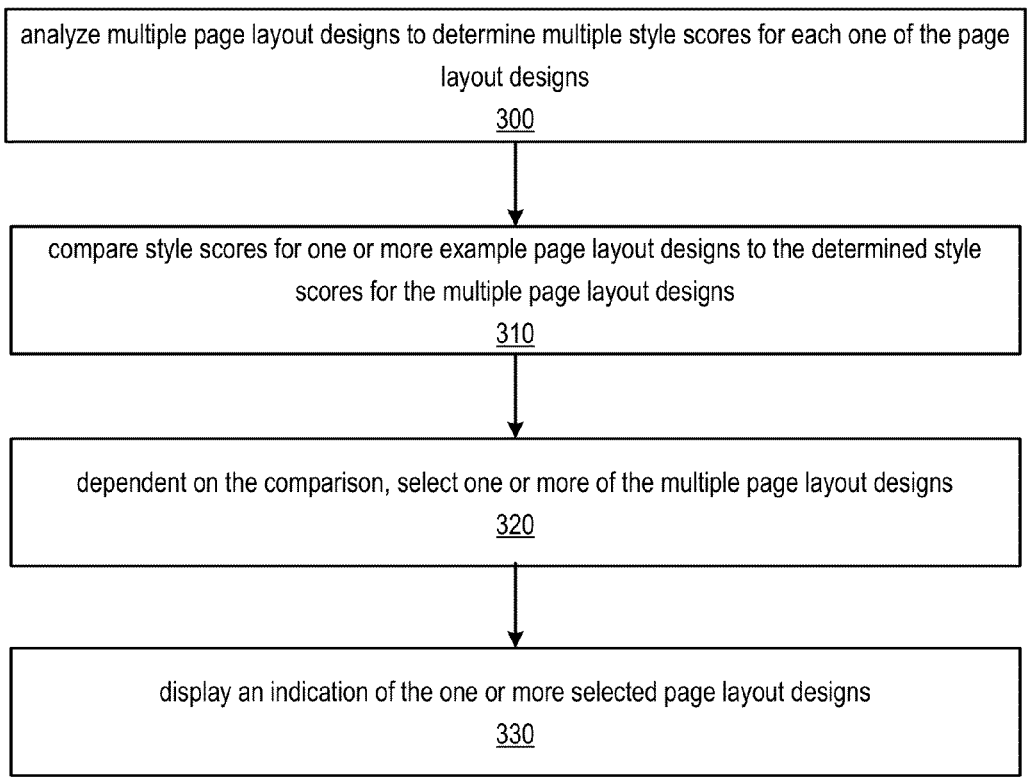
FIG. 3 illustrates an example method that may be used to search for page layout designs of a particular design style.

The system for using design features to search for page layout designs may be configured to locate page layout designs of a particular design style. The system may provide an example-based search mechanism which may enable a user (e.g., a web page designer) to search a gallery of web page designs based on design style similarities between web pages. As an example, page layout search module 100 may be configured to locate page layout designs from database 112 that have a design style which is similar to example page layout designs indicated by user input 102 via user interface 104. FIG. 3 illustrates an example method that may be used by page layout search module 100 to search for page layout designs of a particular design style.

As indicated at 300, the method illustrated in FIG. 3 may include analyzing multiple page layout designs to determine multiple style scores for each one of the page layout designs. Page analyzer 106 of layout search module 100 may analyze a page layout design to determine design features of the page layout design that define the style of the page layout design. In some embodiments, page analyzer 106 may analyze both the document structure (e.g., HTML structure) and the image structure of a page layout design to determine the design features. Example of design features that may be determined by page analyzer 106 from the analysis of document and image structure of the page layout design include, but are not limited to amount of content, lightness/darkness, colorfulness, number of dominant colors, dominant objects, grid layout, photographic/illustrative quality, and/or graphical/textual quality.

Figure 5:
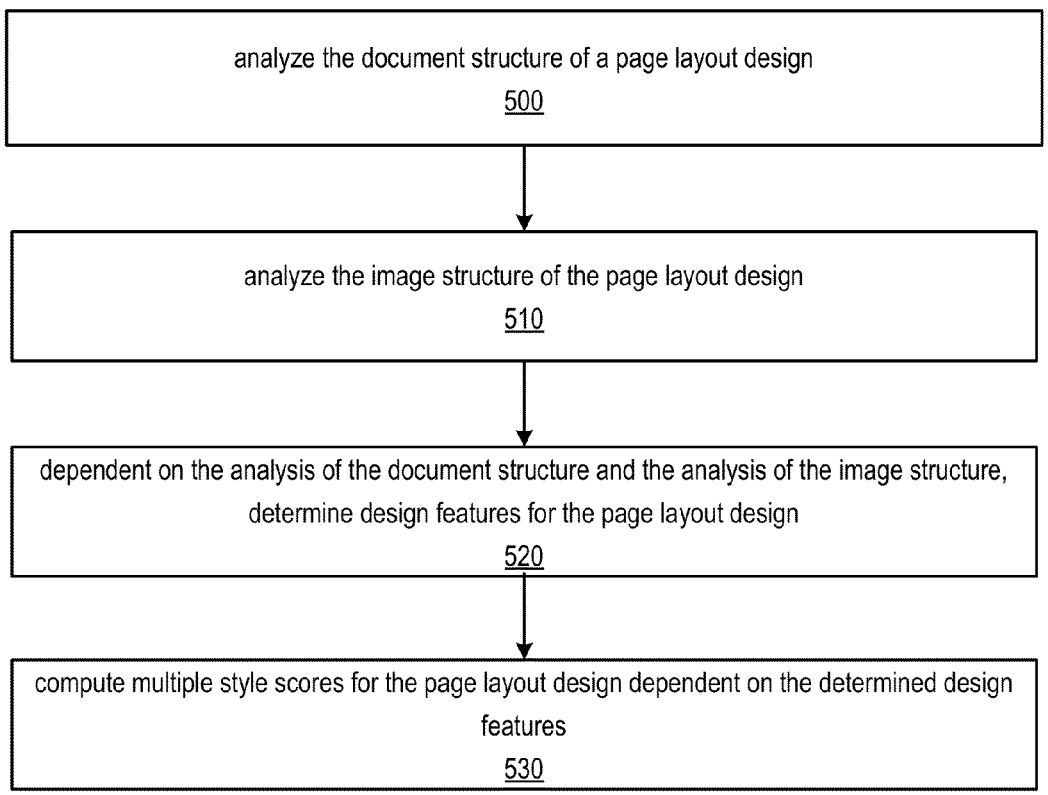
FIG. 5 illustrates a method for analyzing a page layout design to determine features that define the style of the page layout design, according to various embodiments.

As described in further detail below, in reference to FIG. 5, comparison engine 108 of layout search module 100 may compute, from the design features determined by page analyzer 106, multiple style scores for the page layout design. Each one of the style scores computed by comparison engine 108, may indicate the style of the page layout design along a particular style dimension. Examples of style dimensions for a page layout design may include, but are not limited to, "light/dark", "warm/cold", "minimalist/magazine", "clean/busy", "modern/grunge", "colorful/muted", and/or "photographic/illustrative". The multiple page layout designs may be stored, for example, in database 112. Layout search module 100 may store the style scores for a particular page layout design in database 112, in association with the particular page layout design. As an example, comparison engine 108 may store the style scores as a software vector structure in which each element of the vector represents a particular style dimension.

Figure 4:
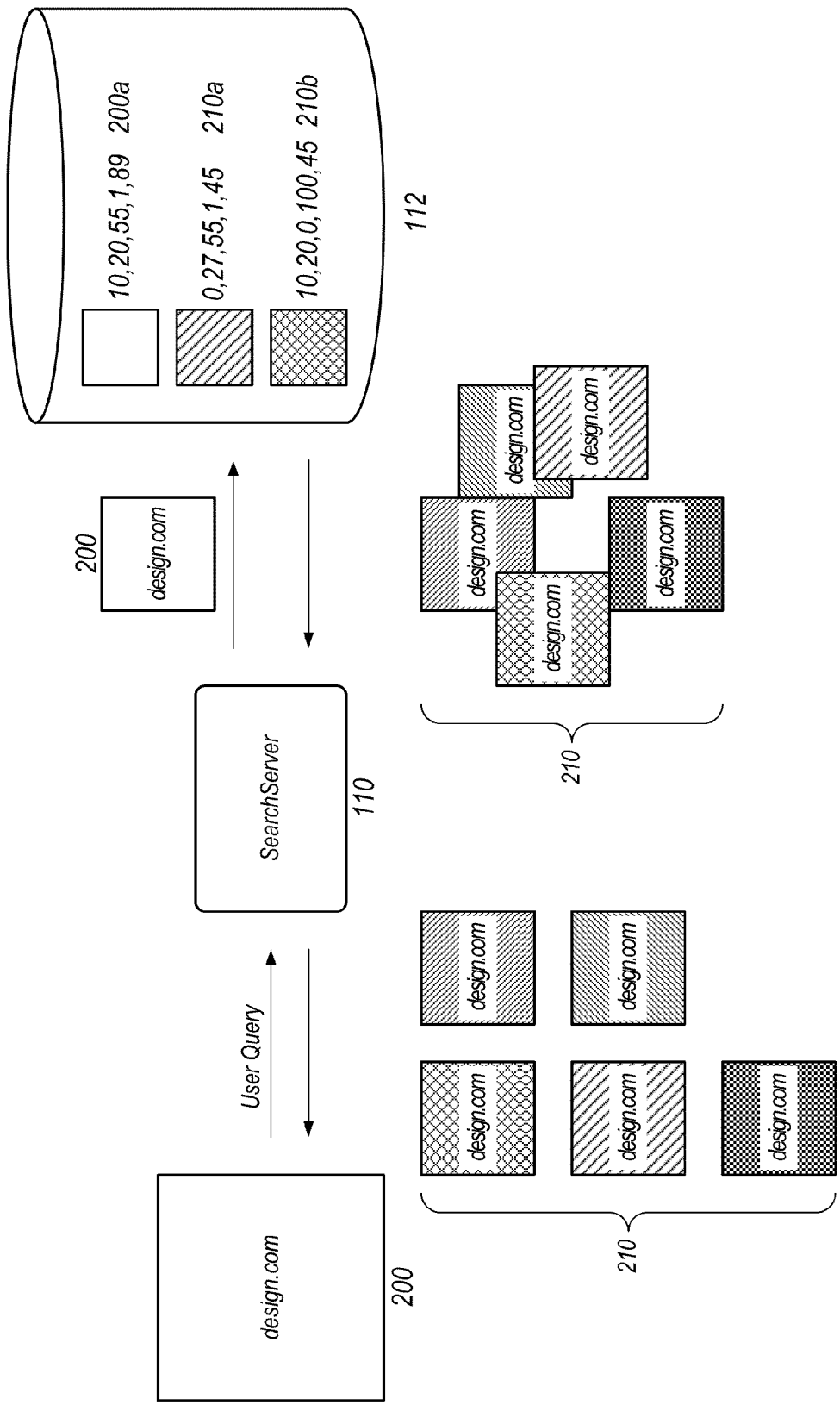
FIG. 4 is a block diagram that illustrates an example of a page layout design search that may be performed using the page layout design search method illustrated in FIG. 3.

FIG. 4 is a block diagram that illustrates an example of a page layout design search that may be performed using the page layout search method illustrated in FIG. 3. Database 112 of FIG. 4 illustrates an example of storing style scores in association with corresponding page layout designs. As shown in FIG. 4, multiple page layout designs may be stored in association with their respective style scores. Elements 200a, 210a and 210b illustrate examples of style scores that may be stored in database 112 in association with corresponding page layout designs. As an example, as illustrated at 210a, style scores for a particular page layout design may be "0, 27, 55, 1, 45." As described in further detail below, each style score provides a numerical representation of the style of a page layout design along a particular style dimension. For example, the first style score shown for page layout design 210a, a style score value of "0", may indicate the style score for page layout design 210a along the "clean/busy" style dimension. In particular, a "clean/busy" style score of "0" may be at the lowest end of a range of style scores for the "clean/busy" style dimension and may indicate that the style of the page layout design is "clean."

As indicated at 310, the method illustrated in FIG. 3 may include comparing style scores for one or more example page layout designs to the determined style scores for the multiple page layout designs. Layout search module 100 may receive, via user interface 104, user input 102, which may indicate one or more example page layout designs. The example page layout design(s) indicated by a user may identify a particular design style that is preferred by the user. The example page layout design(s) identified by the user may be entries to a search query. For example, the user may provide example page layout design(s) to layout search module 100 and may request that layout search module 100 locate other page layout designs that have a design style similar to the design style of the example page layout design(s). FIG. 4 illustrates example page layout 200 that may be indicated by a user as part of a user search query for page layout designs.

The example page layout design(s) indicated by the user may be one or more of the page layout designs that are stored in database 112. For example, the user may browse, via user interface 104, the various page layout designs that are stored in database 112. The user may select one or more of the page layout designs that have a design style which is preferred by the user. The user may request, for example, by clicking a "Search" or "Start Search" button in user interface 104, that a search be performed to locate additional page layout designs in database 112 that have a design style which is similar to the selected page layout designs.

In response to the user's selection of the example page layout design(s), search server 110 of layout search module 100, may be configured to retrieve the style scores for the example page layout design(s). Search server 110 may retrieve the style scores for the example page layout design(s) from database 112, where the style scores may be stored in association with the page layout design(s). For example, as illustrated in FIG. 4, search server 110 may retrieve the style scores for example page layout design 200 from database 112. As shown in FIG. 4, style scores 200a for page layout design 200 may be "10, 20, 55, 1, 89." As described above, the style scores for page layout design 200 may indicate the style of page layout design 200 along various style dimensions.

In other embodiments, a user may indicate one or more example page layout designs which are not stored in database 112 and for which style scores have not been computed. For example, layout search module 100 may provide an option for a user to indicate any page layout design, such as a web page design being viewed in the user's browser, as an example page layout design. In such an example, page analyzer 106 may determine design features and calculate style scores for the example page layout design(s) using a method similar to that described in 300 of FIG. 3 and in FIG. 5. Layout search module may, in some embodiments, store the example page layout design(s) and corresponding style scores in database 112.

In some embodiments, rather than selecting one or more example page layout designs, a user may input style scores for a preferred design style directly into user interface 104. For example, using a mechanism such as a slider, drop down menu or a text entry box, a user may input a value for each style dimension. The values input by the user may indicate the user's preferred design style for a page layout design. In such an embodiment, search server 110 may compare the style scores input by the user to style scores for the page layout designs that may be stored in database 112.

In some embodiments, a user may provide search query entries other than, or in addition to, the example page layout design(s). The user may provide search query entries that include text, or the user may provide search query entries that include text and one or more example page layout designs. For example, the user may enter a textual search query entry that specifies a particular design style, such as "no images," to indicate that the user would like to search for page layout designs that do not include images. As another example, the user may enter a search query entry that includes the word "color" and an example page layout design. Such a search query entry may indicate that the user likes the color of the example page layout design and wants to search for page layout designs with similar colors.

A user may also indicate the relative weight, or priority, for each style dimension for a preferred design style. For example, the user may specify that the "light/dark" and "clean/busy" style dimensions are the most important design features of an example page layout design. In response to such instructions from a user, search server 110 may place a higher priority on these two dimensions when comparing other page layout designs to the example page layout design (s). As another example, the user or the system may indicate that all style dimensions of an example page layout design are of equal importance in a preferred design style. The user may make such an indication by applying the same relative weight, or priority, to all of the style dimensions.

Search server 110 may compare the retrieved (or calculated) style scores for the example page layout design(s) indicated by the user to the style scores for the multiple page layout designs stored in database 112. In reference to the example illustrated in FIG. 4, search server 110 may compare the style scores (200a) for example page layout design 200 to style scores 210a, 210b and other style scores stored in database 112. Search server 110 may, in various embodiments, use different methods to compare style scores for page layout designs. In embodiments in which a user enters, as a search query, text which indicates a particular design style, or one or more particular design features, the indicated design feature (s) may be compared to the multiple page layout designs stored in database 112. For example, search module 100 may calculate style scores for the indicated design feature(s) and may compare the calculated style scores of the indicated design feature(s) to the style scores of the multiple page layout designs. In embodiments in which a user search query includes example page layout designs and indicated design features, both the example page layout designs and the indicated design features may be compared to the multiple page layout designs stored in database 112.

As described above, a set of style scores for a page layout design may be represented by the elements of a software vector structure. Search server 110 may compare the style scores for two different page layout designs by comparing the values of corresponding elements of the style vectors for the two page layout designs. Search server 110 may compare two sets of style scores by calculating an overall "distance" between the two sets of styles scores for the two page layout designs dependent on the comparison of the corresponding elements of the style vectors. As an example, search server 110 may calculate a Euclidean distance between two style vectors. The Euclidean distance ($d_{ij}$) between a style vector i and a style vector j may be computed as in equation (1):

$$d_{ij} = \sqrt{\sum_{k=1}^{n} (x_{ik} - x_{jk})^2} \quad (1)$$

for n number of style scores x. In other embodiments, search server 110 may use other methods to compare the style scores for the example page layout design(s) indicated by a user to the style scores for the page layout designs stored in database 112. In other embodiments, search server 110 may use other metrics instead of, or in addition to, the Euclidean distance to compare style scores for page layout designs. As an example, search server 110 may compute a Mahalanobis distance between the style vectors for the page layout designs. As another example, a distance learning metric may be used to determine similar page layout designs. In such an example, search server 110 may be provided with examples of page layout designs that are known to be similar. Based on the similar examples, search server 110 may learn to recognize critical page layout design features which indicate similar design styles.

As indicated at 320, the method illustrated in FIG. 3 may include, dependent on the comparison, selecting one or more of the multiple page layout designs. For example, search server 110 may select one or more of the multiple page layout designs by determining page layout designs that are similar to the example page layout designs. Search server 110 may determine whether an example page layout design and another page layout design have a similar design style dependent on a Euclidean distance, calculated as described above, between the two page layout designs. For example, if the Euclidean distance between the two page layout designs is below a certain threshold, search server 110 may determine that the page layout designs have a similar design style. The distance threshold below which two page layout designs may be considered to be similar may vary from embodiment to embodiment. Search server 110 may determine that all page layout designs in database 112 within a certain Euclidean distance of an example page layout design have a design style that is similar to the design style of the example page layout design. FIG. 4 illustrates an example of page layout designs 210, which are within a certain Euclidean distance of example page layout design 200. As illustrated in FIG. 4, search server 110 has located page layout designs 210 in database 112 and returned page layout designs 210 in response to a user search query.

As described above, a user may request a search other than a search for similar page layout designs. For example, a user may request a search for page layout designs that are opposite of an example page layout design. In such an example, search sever 110 may select page layout designs which have style scores that are a certain distance away from the example page layout design indicated by the user. As another example, a user may specify an example page layout design and may also specify text which indicates a particular design style. The user may request a search for page layout designs that are similar to the example page layout design and for which the indicated particular design style varies. For example, a user may request a search for designs which are similar to an example page layout design, and that also vary in color. In such an example, search server 110 may select page layout designs within a certain distance of the example page layout design for all style dimensions except the "colorful/muted" style dimension. In selecting page layout designs, search server 110 may allow the "colorful/muted" style dimension to vary over a wide range in order to select page layout designs that vary in color.

The method illustrated in FIG. 3, as indicated at 330, may include displaying an indication of the one or more selected page layout designs. The displayed page layout designs may be page layout designs that have a design style which is similar to the design style of the one or more example page layout designs indicated by the user. As an example, layout search module 100 may display an indication of all of the page layout designs that search server 110 has determined are within a certain Euclidean distance of the one or more example page layout designs indicated by the user. Element 210 of FIG. 2 shows an example display of page layout designs 210a-210f that have a design style which is similar to the design style of example page layout design 200.

Page Layout Design Analysis

As described above, a page layout design may be analyzed to determine various design features that define the style of the page layout design. FIG. 5 illustrates a method for analyzing a page layout design to determine design features that define the style of the page layout design, according to some embodiments. The method illustrated in FIG. 5 may be implemented by page analyzer 106 of page layout design search module 100. Page analyzer 106 may analyze both the document structure (e.g., HTML structure) and the image structure of a page layout design to determine the design features for the page layout design. In other embodiments, page analyzer 106 may analyze only the document structure or only the image structure of a page layout design to determine the design features for the page layout design. In yet other embodiments, page analyzer 106 may analyze other characteristics or structures of a page layout design to determine the design features for the page layout design. Page analyzer 106 may use the determined design features for a page layout design to characterize the style of the design. For example, page analyzer 106 may use the design features to characterize the style of the design according to multiple style dimensions, such as "light/dark", "warm/cold", and/or "clean/busy". Based on the determined design features, page analyzer 106 may compute style scores which quantify the style of the design for each one of the style dimensions. In some embodiments, the page layout designs may be rendered at a resolution of 1024×768 for the analysis of the design features. In other embodiments, the page layout designs may be rendered at other resolutions for the analysis of the design features.

As shown at 500, the method illustrated in FIG. 5 may include analyzing the document structure of a page layout design. Page analyzer 106 may analyze the document structure of a page layout design to determine design features which define the style of the page layout design. Features of the document structure for a page layout design may indicate the style of the page layout design. For example, the amount of content and the grid layout of the document structure for a page layout design may indicate whether the page layout design has a "clean" or "busy" style. In some embodiments, page analyzer 106 may analyze the structure of a hypertext markup language (HTML) document which represents a web page to determine design features which define the style of the web page.

The layout of a web page may provide multiple visual cues which may help a viewer of the web page distinguish between different parts of the web page. Such visual cues may include, but are not limited to: position, lines, font size and weight, images, colors, and/or blank areas. These visual cues may define various segments of the web page. The characteristics (e.g., size, placement) of the various segments of a web page may define the layout of the web page. The visual cues may be represented by various attributes and/or elements (e.g., tags) in the HTML document for the web page. Accordingly, page analyzer 106 may analyze the document structure of the HTML document for a web page to determine a structural segmentation of the web page that defines the layout of the web page. The determined structural segmentation may include various visual segments of the webpage that are separated by the visual cues.

An HTML document for a web page may be represented using a hierarchical tag tree, such as a document object model (DOM). A DOM may be a hierarchical tree structure with various connected nodes that represent the hierarchy of tags within the structure of the HTML document. For example, each node in the DOM may represent a tag in the HTML document and each node in the DOM may be connected to parent and/or child nodes within the tree. The connectivity of the nodes in the DOM, or the DOM structure, may represent the hierarchical structure of the HTML document. Accordingly, each node in a DOM tree may correspond to a different section of a web page.

Conventional methods may use the HTML DOM tree for a web page to divide the web page into various distinct segments. However, the DOM tree may not accurately, or completely, represent the actual structure of the web page. For example, a DOM tree may include a node which represents a BODY tag in the HTML document, and which indicates the body of a webpage. Various tags may be distributed within the portion of the HTML document represented by the BODY tag. However, such tags may not have any particular hierarchical structure within the BODY section of the HTML document. Accordingly, the DOM tree may not provide any hierarchical structure for these tags. Therefore, using only the DOM tree, it may be difficult to distinguish any segments within the structure of the body of the web page. As another example, all tags within an HTML document for a web page may not necessarily represent distinct, visual segments of the web page. For example, a tag which represents a paragraph may merely provide organizational structure to the content of a web page, but may not distinguish a visual segment of the web page layout. Accordingly, a conventional HTML DOM for a web page may not provide an accurate mechanism for determining the segments of the web page that define the layout of the web page.

Page analyzer 106 may construct a perceptual DOM tree to represent the visual structure, or visual segments, of a web page layout. The perceptual DOM tree may be based on both the conventional DOM tree for the HTML document representing the web page and visual cues from the layout of the web page. Such visual cues, as described above, may be lines, fonts, images, colors, and/or blank areas which distinguish between different parts of the web page. Page analyzer 106 may use a Vision-based Page Segmentation (VIPS) algorithm, for example, the VIPS algorithm described in [Yu, S., Cai, D., Wen, J., Ma, W., 2003. Improving pseudo-relevance feedback in web information retrieval using web page segmentation, In *WWW '03: Proceedings of 12$^{th}$ International Conference on the World Wide Web*, 11-18.], to identify visual segments of the web page that define the layout of the web page. The identified visual segments may be used to construct the perceptual DOM tree.

The VIPS algorithm may use the visual cues of a web page, such as images, lines, fonts, and/or blank areas, which act as implicit and/or explicit visual separators within the layout of a web page, to distinguish between different visual segments of the web page. The VIPS algorithm may extract the visual separators for a web page from the HTML document that defines the web page. The VIPS algorithm may use a set of heuristics, based on the visual cues described above, to locate visual separators with the HTML document. Using the DOM tree for the HTML document and the visual separators extracted from the HTML document, the VIPS algorithm may iteratively extract blocks from the DOM tree. The VIPS algorithm may continue to iteratively extract blocks from the DOM tree until each distinct block represents a visual segment of the web page. The VIPS algorithm may construct a perceptual DOM tree from the determined visual segments of the web page. For example, each node in the DOM tree may represent a distinct visual segment of the web page.

Figure 6:
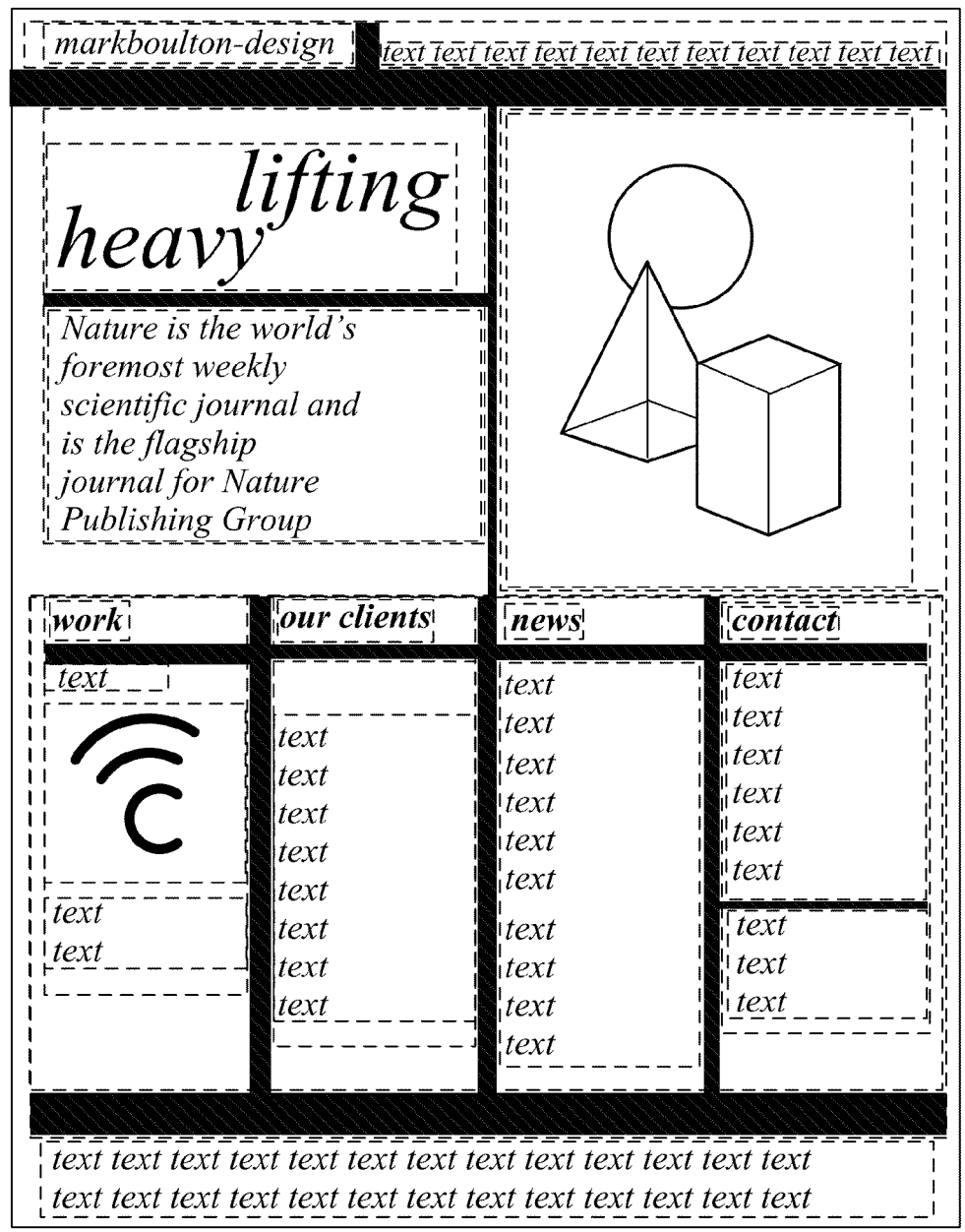
FIG. 6 illustrates an example of a web page that has been divided into visual segments using the VIPS algorithm, according to various embodiments.

FIG. 6 illustrates an example of a web page that has been divided into visual segments using the VIPS algorithm. The various visual segments of the web page that are identified by the VIPS algorithm are indicated by dashed lines in FIG. 6. The various visual separators of the web page that are identified by the VIPS algorithm are indicated by solid lines in FIG. 6. Each of the visual segments identified in FIG. 6 may be represented as a node in a perceptual DOM tree that represents the web page. As described in further detail below, page analyzer 106 may use the perceptual DOM tree to determine design features of the web page that define the style of the web page.

As indicated at 510, the method illustrated in FIG. 5 may include analyzing the image structure of the page layout design. Page analyzer 106 may analyze the image structure of a page layout design to determine design features which define the style of the page layout design. The design features of a page layout design, for example, may be light or dark, or colorful or monochromatic. Such design features may define the style of the page layout design as warm or cold, or colorful or muted. As an example, page analyzer 106 may analyze the image structure of a web page to determine design features of the web page which define the style of the web page.

Page analyzer 106 may use a variety of image processing techniques to analyze the image structure of a web page. For example, page analyzer 106 may use image segmentation to extract visual elements from the structure of the web page. Page analyzer 106 may use image segmentation to separate foreground objects from the background of a web page. The image segmentation process performed by page analyzer 106 may include detecting the edges of objects depicted on a web page. Page analyzer 106 may perform edge detection across the display of the web page and may dilate any detected edges. Page analyzer 106 may then fill any regions that are enclosed by detected edges. Each filled region may be labeled by page analyzer 106. Accordingly, such an image segmentation process executed by page analyzer 106 may produce labels for each foreground object that is depicted on a web page. The foreground objects are, via the applied labels, separated from the background of the web page.

Figure 7:
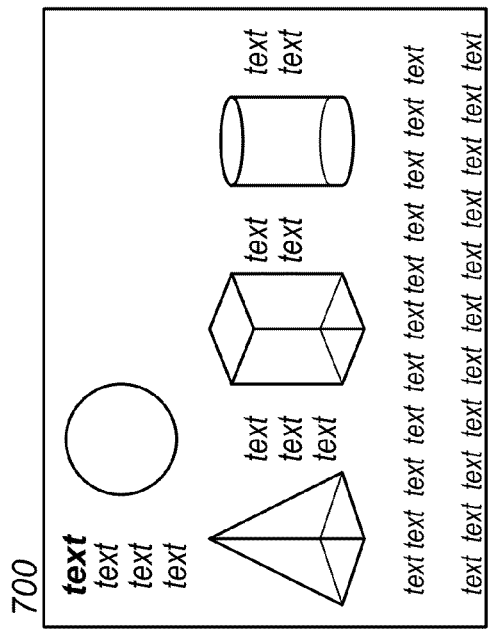
FIG. 7 illustrates an example of results that may be obtained by performing image segmentation on a page layout design.
Figure 7:
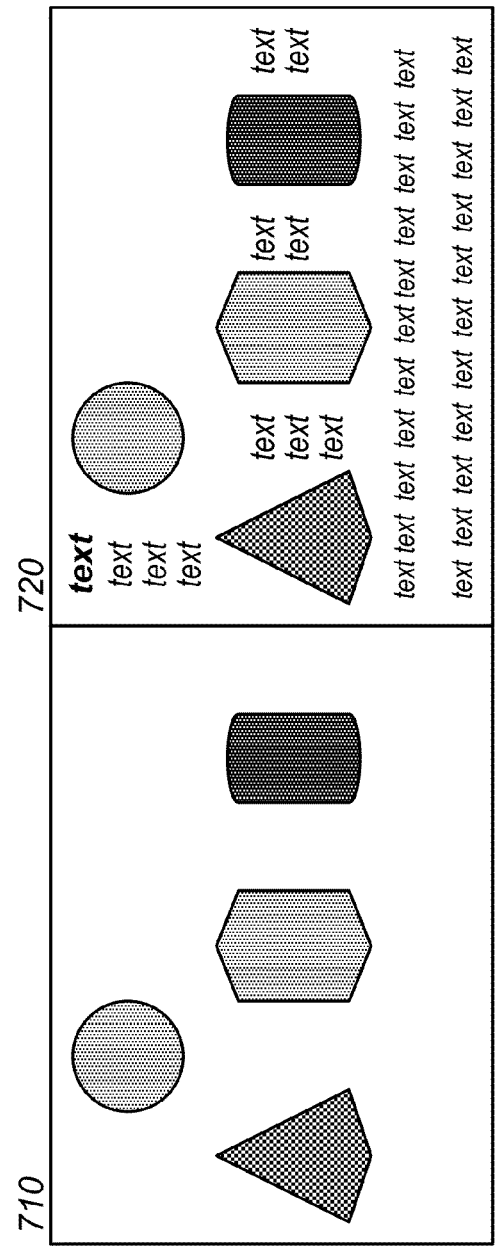

Page analyzer 106 may perform image segmentation for a page layout design on two different versions of the page layout design. For example, image segmentation may be performed on an original version of the page layout design which includes all of the text for the page layout design. Image segmentation may also be performed on a version of the page layout design from which the text has been extracted. FIG. 7 illustrates an example of results that may be obtained by performing image segmentation on a page layout design. Element 700 of FIG. 7 illustrates an example page layout design. An example output that may result from performing image segmentation on page layout 700, with the textual content removed from 700, is illustrated in 710. An example output that may result from performing image segmentation on the original version of page layout 700 (with textual content of 700 included in the image segmentation), is illustrated in 720. The examples illustrated in both 710 and 720 show that foreground objects have been identified and separated from the background of page layout 700.

As indicated at 520, the method illustrated in FIG. 5 may include, dependent on the analysis of the document structure and the analysis of the image structure, determining design features for the page layout design. As described above, design features for a page layout design may define the style of the page layout design. Page analyzer 106 may determine a variety of design features for a page layout design from the perceptual DOM tree derived for the page layout and from the image segmentation of the page layout. Examples of the design features that may be determined by page analyzer 106 may include, but are not limited to, the following:

Amount of Content Page analyzer 106 may determine the amount of content in a page layout design by counting the number of nodes in the perceptual DOM tree. As described above, each node in the perceptual DOM tree constructed by page analyzer 106 may represent a segment of the page layout. Accordingly, the number of nodes in the perceptual DOM tree may be a good indicator of the number of segments, or the amount of content, in the page layout design. Page analyzer 106 may also determine the amount of content in a page layout design by counting the number of words present on the page layout. The number of words may be extracted from an HTML document which represents a web page. The number of words may also be determined from the result of an image segmentation performed on a page layout (with text included in the page layout), as described above. Page analyzer 106 may also determine an amount of content in a page layout design by counting the number of objects identified as a result of performing an image segmentation on the page layout design. Page analyzer 106 may also determine an amount of content in a page layout design by calculating the ratio of foreground images to background area, using the results of an image segmentation performed on the page layout. As an example, the amount of content in a page layout design may indicate whether the style of the page layout design is "minimalist" or "magazine", and/or whether the style of the page layout design is "clean" or "busy."

Lightness/Darkness Page analyzer 106 may determine the lightness, or darkness, of a page layout design. As an example, page analyzer 106 may determine a lightness, or darkness, value for the page layout design by calculating an average brightness value for all of the pixels in the page layout design that are in the hue, saturation and value (HSV) color space. The lightness, or darkness, value of a page layout design may indicate whether the style of the page layout design is "light" or "dark".

Colorfulness Page analyzer 106 may determine the colorfulness of a page layout design. As an example, page analyzer 106 may determine a colorfulness value for the page layout design by calculating an average chroma value for all pixels in the page layout design that are in the *Commission Internationale d'Eclairage* lightness, chroma and hue (CIELCH) color space. The colorfulness value of a page layout design may indicate whether the style of the page layout design is "colorful" or "muted".

Number of Dominant Colors Page analyzer 106 may determine the number of dominant colors in a page layout design. As an example, page analyzer 106 may calculate a histogram for the hues of all of the pixels in a page layout design. Each bin in the histogram may represent a particular hue in the page layout design and may indicate a percentage of pixels which have the particular hue value. Page analyzer 106 may count the number of bins (starting from the bin with the largest percentage of pixels) that include 75% of the pixels in the page layout design. The number of bins may be considered the number o dominant colors in the page layout designs. In other embodiments, percentages other than 75% may be used for counting the number of bins that represent the number of dominant colors in a page layout design. As an example, the number of dominant colors in a page layout design may indicate whether the style of the page layout design is "clean" or "busy."

Dominant Object Page analyzer 106 may determine the characteristics of a dominant object in a page layout design. As an example, page analyzer 106 may identify a dominant object in a page layout design by calculating the bounding boxes for each of the segments identified, as described above, in an analysis of the document structure of the page layout design. Page analyzer 106 may determine that the largest bounding box contains the dominant object in a page layout design. Page analyzer 106 may determine a percentage of the page layout that is covered by the dominant object in the page layout design. The percentage of the page layout covered by the dominant object may indicate whether the style of the page layout design is clean or busy. For example, if a large portion of a page layout design (e.g., above 75%) is covered by a single dominant object, the style of the page layout is likely to be a "clean" style, with few objects on the page.

Grid Layout Page analyzer 106 may determine the whether a page layout design follows a grid layout. As an example, page analyzer 106 may identify the visual separators (e.g., separators between visual segments, as illustrated in FIG. 6) using a method similar to that described above in reference to 500 of FIG. 5. Page analyzer 106 may use the perceptual DOM tree, constructed as described above, and the visual separators to determine whether the segments of a page layout design are arranged in a grid fashion. The grid layout design feature of a page layout design may indicate whether the style of the page layout design is modern or grunge. For example, a page layout design that is organized according to a grid is more likely to be a "modern" style than a "grunge" style.

Photographic/Illustrative Quality Page analyzer 106 may determine the photographic, or illustrative, quality of a page layout design. As an example, page analyzer 106 may determine whether a page layout design includes more photographic or more illustrative content. Page analyzer 106 may calculate a histogram for all of the gradients of the page layout design. Page analyzer 106 may measure the tail of the histogram. A heavy-tail histogram may indicate that the style of the page layout design is more "photographic" than "illustrative".

Graphical/Textual Quality Page analyzer 106 may determine the graphical, or textual, quality of a page layout design. Page analyzer 106 may determine whether a page layout design includes more graphical or more textual content. As an example, page analyzer 106 may count the number of objects identified in an image segmentation process. As described above, image segmentation may be performed on a page layout design after the text has been removed from the page. Page layout designs with a large amount of textual content may appear empty after the text is removed. Accordingly, image segmentation may identify a low number of objects for page layout designs which include a large amount of textual content. Conversely, page layout designs which include a large amount of graphical content may have a high number of objects that are identified in an image segmentation process. The graphical, or textual, quality of a page layout design may indicate whether the style of the page layout design is a "minimalist" style or a "magazine" style. For example, a highly graphical page layout design may be considered to have a "magazine" style.

Page analyzer 106 may use the results of the document structure analysis and the results of the image structure analysis for a page layout design to compute a value for each one of the design features identified above. In some embodiments, the calculated value for a design feature may be a value between 0 and 100. For example, page analyzer 106 may calculate a value between 0 and 100 that represents the amount of content in a page layout design. In such an example, a value equal to, or close to, 0 may indicate that a page layout design has a low amount of content. A value equal to, or close to, 100 may indicate that a page layout design has a high amount of content. In other embodiments, other values, or ranges of values, may be used to represent the design features.

Page analyzer 106 may use various combinations of the results from the document structure analysis and the image structure analysis to compute values for the various design features. Some design features may be evident from the analysis of the document structure of a page layout design. For example, the perceptual DOM tree constructed, as described above, from the analysis of the document structure of a page layout design, may indicate design features such as grid layout, and/or a dominant object. As another example, the image structure analysis of a page layout design may indicate a design feature such as graphical, or textual, quality. Page analyzer 106 may also combine the results of the document structure and the image structure analysis to compute a value for a design feature. For example, page analyzer 106 may compute a value for the amount of content in a page layout design by combining the results from both the document structure analysis and the image structure analysis. The document structure analysis may indicate an amount of content via the number of nodes in the perceptual DOM tree. The image structure analysis may indicate an amount of content via the number of foreground objects identified by performing an image segmentation on the page layout design.

As indicated at 530, the method illustrated in FIG. 5 may include computing multiple style scores for the page layout design dependent on the determined design features. Each one of the multiple style scores may represent a style dimension of the page layout design. A style dimension may describe the style of a page layout design according to a certain set of characteristics. Examples of the various style dimensions for which style scores may be computed are as follows:

Light/Dark A page layout design which predominately includes bright colors may be described as having a "light" style. A page layout design which predominately includes dark colors may be described as having a "dark" style. Accordingly, the "light/dark" style dimension may represent the brightness of a page layout design.

Warm/Cold A page layout design which predominately includes warm color hues may be described as having a "warm" style. A page layout design which predominately includes cold color hues may be described as having a "cold" style. Accordingly, the "warm/cold" style dimension may represent the type of color hues of a page layout design.

Minimalist/Magazine A page layout design with a "minimalist" style may have a design that includes only a minimal amount of content or patterns, and/or includes only essential items and content. A page layout design with a "minimalist" style may not have excessive decoration or clutter. A page layout design with a "magazine" style may include a significant amount of content and may have a glossy, or shiny, appearance.

Clean/Busy A page layout design with a "clean" style may have an orderly, organized design. A page layout design with a "busy" style may have a large amount of content and may have a cluttered appearance.

Modern/Grunge A page layout design with a "modern" style may use straight lines, open spaces and minimal decoration. A page layout design with a "grunge" style may use irregular, inconsistent or crooked lines and may include visual elements that appear worn or old.

Colorful/Muted A page layout design with a "colorful" style may include a large variety of bright colors. A page layout design with a "muted" style may include subtle, muted colors.

Photographic/Illustrative A page layout design with a "photographic" style may include a large amount of photographic images. A page layout design with an "illustrative" style may include a large amount of illustrated images.

Each style dimension may be represented by a style score which is a numerical value. In some embodiments, the style score may be a value within a range of numerical values. As an example, the "clean/busy" style dimension may be represented by a style score which is between the values of 0 and 100. A style score of 0 for the "clean/busy" style dimension may indicate a design style that is "clean." A style score of 100 for the "clean/busy" style dimension may indicate a design style that is "busy." In other embodiments, other value ranges may be used to represent each style score.

Page analyzer 106 may use the determined design features for a page layout design to calculate a style score for each of the style dimensions. Each style dimension may have a corresponding function which may be used by page analyzer 106 to compute a style score for the style dimension that is dependent on the determined design features. The function may be an aggregate value which combines the values of all of the design features. The function may weight each design feature value according to the relative importance of the design feature to the style dimension. For example, the lightness/darkness design feature may be more important than the grid layout feature in determining a score for the light/dark style dimension of the page layout design. Equation 2 illustrates an example function that may be used to calculate a "clean/busy" style score dependent on the design feature values computed for a page layout design.

$$"\text{clean/busy}" = .4(\text{grid layout}) + .3(\text{content amount}) + \\ .2(\text{graphic/text}) + .05(\text{dominant colors}) + \\ .05(\text{dominant object}) + 0(\text{lightness/darkness}) + 0(\text{colorful}) \quad (2)$$

As shown in Equation 2, values for the grid layout and content amount design features may be weighted more heavily when a "clean/busy" style score is calculated. Also shown in Equation 2, values for design features such as lightness/darkness and colorful may not be considered when a "clean/busy" style score is calculated. In some embodiments, the weighting of Equation 2 for each style dimension may be based on a training dataset. The training dataset may be based on user rankings of each style dimension for multiple page layout designs. The particular weightings used by the weighting function may be based on this dataset, in some embodiments. In other embodiments, other functions may be used to calculate a style score for each style dimension dependent on determined design feature values.

The set of style scores for a page layout design may be stored, in association with the page layout design, as a software vector structure. Each element of the vector may represent a particular style dimension. As an example, element zero of the style score vector may represent the "light/dark" style dimension. Page analyzer 106 may create a software recognizable representation of each style score and store each representation in a corresponding element of the style score vector. Elements 200a, 210a and 210b illustrate examples of style scores that have been calculated for page layout designs stored in database 112.

A page layout design search module may be implemented in any authoring application, including but not limited to Adobe® Flash Professional®, Abode® Flash Builder®, Adobe® Flash Catalyst®, or Adobe® Creative Suite®. A page layout design search module may, for example, be implemented as a stand-alone application, as a module of a page layout design application such as Adobe® Flash Professional®, Abode® Flash Builder®, Adobe® Flash Catalyst®, or Adobe® Creative Suite®, as a plug-in for applications including such as Adobe® Flash Professional®, Abode® Flash Builder®, Adobe® Flash Catalyst®, or Adobe® Creative Suite®, and/or as a library function or functions that may be called by other applications. Note that Adobe® Flash Professional®, Abode® Flash Builder®, Adobe® Flash Catalyst®, and Adobe® Creative Suite® are provided as examples, and are not intended to be limiting.

Example System

Figure 8:
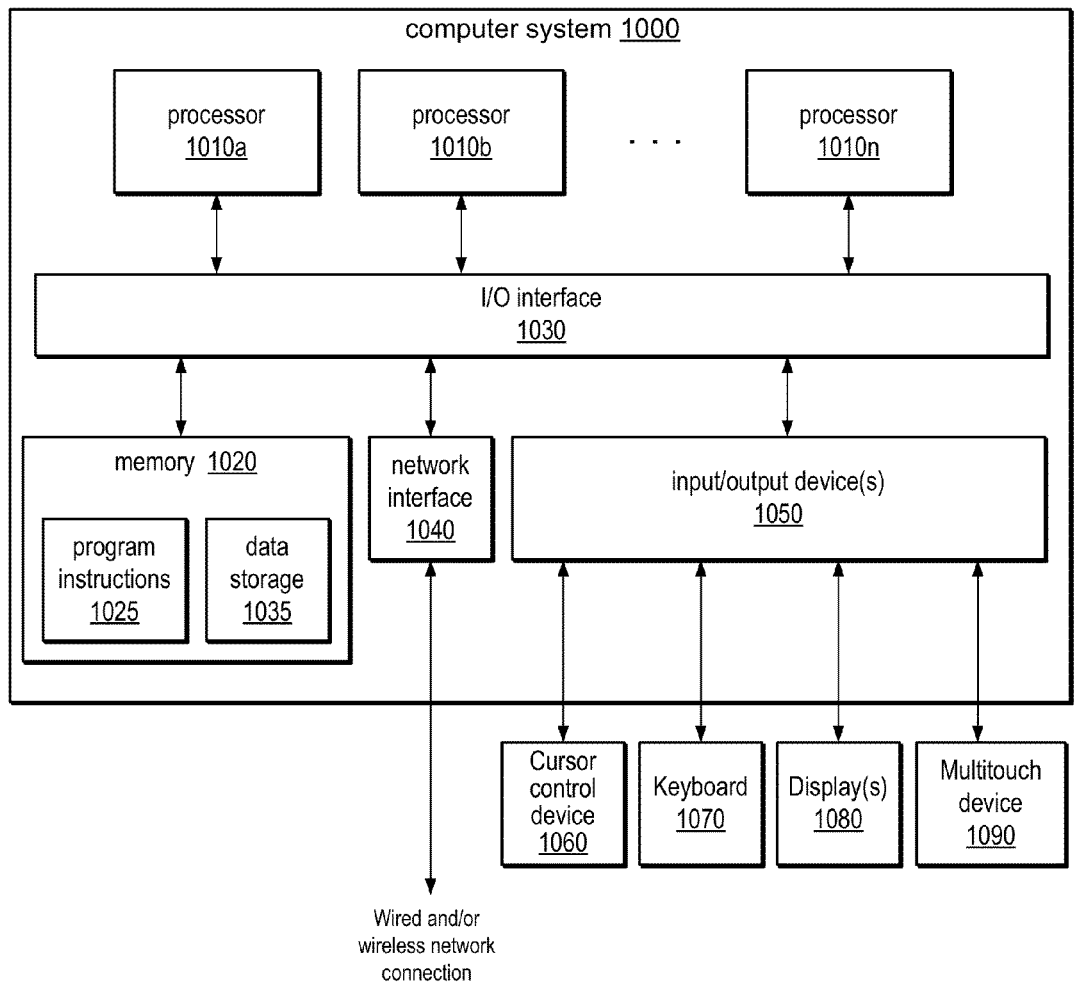
FIG. 8 illustrates an example computer system suitable for implementing various components of the system and method for using design features to search for page layouts.

Various components of embodiments of methods as illustrated and described in the accompanying description may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for using design features to find page layout designs, comprising:
    performing, by one or more computing devices:
        analyzing a plurality of page layout designs to determine a set of style scores for each respective page layout design, each style score in the set of style scores representing a style dimension of the respective page layout design, the style dimension defined by a set of characteristics that include at least two alternatives, one to another, the style dimension determined at least in part by a function which weights design feature values according to a relative importance of a design feature;
        receiving a user indication of an example page layout design, and
        searching for page layout designs similar to the example page layout design by at least:
            using the style scores of the example page layout design as search query entries to identify page layout designs of the plurality of page layout designs that are similar to the example page layout design;
            comparing one or more additional sets of style scores for the example page layout design to the set of style scores for each respective page layout design; and
            based on said comparing, selecting one or more of the plurality of page layout designs based on the similarity to the example page layout design; and
        displaying an indication of the one or more selected page layout designs as a result of the search.

2. The method of claim 1, wherein said analyzing comprises:
    analyzing a document structure and an image structure of the respective page layout design, wherein characteristics of the document structure and characteristics of the image structure indicate a plurality of specific design features for the respective page layout design.

3. The method of claim 2, wherein said analyzing the document structure of the respective page layout design comprises determining a structural segmentation for the respective page layout design, wherein the respective page layout design is represented by a hypertext markup language (HTML) document, and wherein said determining the structural segmentation is dependent on a document object model (DOM) for the HTML document and dependent on visual cues of the respective page layout design.

4. The method of claim 2, wherein said analyzing the image structure of the respective page layout design comprises determining an image segmentation for the respective page layout design, and wherein said determining an image segmentation comprises distinguishing between foreground and background objects in the respective page layout design.

5. The method of claim 1, wherein the user input further includes text which indicates one or more page layout design features and further comprising:
- comparing the one or more indicated page layout design features to the set of style scores for each respective page layout design;
- wherein said selecting is dependent on said comparing the one or more indicated page layout design features to the set of style scores for each respective page layout design.

6. The method of claim 1, wherein said selecting comprises determining one or more of the plurality of page layout designs that are similar to the one or more example page layout designs.

7. The method of claim 1, wherein the function is an aggregate value which combines values of all of the design features.

8. The method of claim 1, wherein displaying the indication of the one or more selected page layout designs comprises displaying the selected page layout designs as thumbnail representations of the selected page layout designs.

9. A computer-readable storage medium comprising instructions that, responsive to execution by a computer, cause the computer to implement a page layout design search module configured to:
- analyze a plurality of page layout designs to determine a set of style scores for each respective page layout design, each style score in the set of style scores representing a style dimension of the respective page layout design, the style dimension defined by a set of characteristics that include at least two alternatives, one to another, the style dimension determined at least in part by a function which weights design feature values according to a relative importance of a design feature;
- receive a user indication of an example page layout design; and
- search for page layout designs similar to the example page layout design by at least:
  - using the style scores of the example page layout design as search query entries to identify page layout designs of the plurality of page layout designs that are similar to the example page layout design;
  - comparing an additional set of style scores for the example page layout design to the set of style scores for each respective page layout design; and
  - dependent on the comparison and the similarity of the respective page layout designs to the example page layout design, selecting one or more of the plurality of page layout designs; and
- displaying an indication of the one or more selected page layout designs as a result of the search.

10. The computer-readable storage medium of claim 9, wherein said analyzing comprises:
- analyzing a document structure and an image structure of the respective page layout design, wherein characteristics of the document structure and characteristics of the image structure indicate a plurality of specific design features for the respective page layout design.

11. The computer-readable storage medium of claim 10, wherein said analyzing the document structure of the respective page layout design comprises determining a structural segmentation for the respective page layout design, wherein the respective page layout design is represented by a hypertext markup language (HTML) document, and wherein said determining the structural segmentation is dependent on a document object model (DOM) for the HTML document and dependent on visual cues of the respective page layout design.

12. The computer-readable storage medium of claim 10, wherein said analyzing the image structure of the respective page layout design comprises determining an image segmentation for the respective page layout design, and wherein said determining an image segmentation comprises distinguishing between foreground and background objects in the respective page layout design.

13. The computer-readable storage medium of claim 9, wherein the user input includes text which indicates one or more page layout design features and further comprising:
- comparing the one or more indicated page layout design features to the set of style scores for each respective page layout design,
- wherein said selecting is dependent on said comparing the one or more indicated page layout design features to the set of style scores for each respective page layout design.

14. The computer-readable storage medium of claim 9, wherein displaying the indication of the one or more selected page layout designs comprises displaying the selected page layout designs as thumbnail representations of the selected page layout designs.

15. A system, comprising:
- a memory; and
- one or more processors coupled to the memory and configured to utilize instructions stored in the memory to implement a page layout design search module configured to:
  - analyze a plurality of page layout designs to determine a set of style scores for a respective page layout design, each style score in the set of style scores representing a style dimension of the respective page layout design, the style dimension defined by a set of characteristics that include at least two alternatives, one to another, the style dimension determined at least in part by a function which weights design feature values according to a relative importance of a design feature;
  - receive a user indication of an example page layout design; and
  - search for page layout designs similar to the example page layout design by at least:
    - using the style scores of the example page layout design as search query entries to identify page layout designs of the plurality of page layout designs that are similar to the example page layout design;
    - comparing one or more additional sets of style scores for the example page layout design to the set of style scores for the respective page layout design; and
    - based on the comparison and the similarity of the respective page layout designs to the example page layout design, selecting one or more of the plurality of page layout designs; and
  - displaying an indication of the one or more selected page layout designs as a result of the search.

16. The system of claim 15, wherein the plurality of page layout designs are analyzed by at least:
- analyzing a document structure and an image structure of at least one respective page layout design, wherein characteristics of the document structure and characteristics of the image structure indicate a plurality of specific design features for the at least one respective page layout design.

17. The system of claim 16, wherein said analyzing the document structure of the at least one respective page layout design comprises determining a structural segmentation for the at least one respective page layout design, wherein the at least one respective page layout design is represented by a hypertext markup language (HTML) document, and wherein said determining the structural segmentation is dependent on a document object model (DOM) for the HTML document and dependent on visual cues of the at least one respective page layout design.

18. The system of claim 16, wherein said analyzing the image structure of the at least one respective page layout design comprises determining an image segmentation for the at least one respective page layout design, and wherein said determining an image segmentation comprises distinguishing between foreground and background objects in the at least one respective page layout design.

19. The system of claim 15, wherein the user input includes text which indicates one or more page layout design features, and wherein the page layout design search module is further configured to:
 compare the one or more indicated page layout design features to the set of style scores for the respective page layout design,
 wherein the one or more of the plurality of page layout designs are selected based on a comparison of the one or more indicated page layout design features to the set of style scores for the respective page layout design.

20. The system of claim 15, wherein displaying the indication of the one or more selected page layout designs comprises displaying the selected page layout designs as thumbnail representations of the selected page layout designs.

* * * * *